(12) United States Patent
Fung

(10) Patent No.: US 7,193,377 B2
(45) Date of Patent: Mar. 20, 2007

(54) SYSTEM AND METHOD FOR CONTROLLING MOTOR SPEED USING A BIASED PULSE WIDTH MODULATED DRIVE SIGNAL

(75) Inventor: Patrick Ying Cheung Fung, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 10/794,157

(22) Filed: Mar. 4, 2004

(65) Prior Publication Data

US 2005/0196157 A1 Sep. 8, 2005

(51) Int. Cl.
*H02P 1/18* (2006.01)
(52) U.S. Cl. .............. 318/254; 318/138; 318/439; 318/499; 318/432; 388/800; 388/907.5; 388/819
(58) Field of Classification Search ........... 318/254, 318/138, 439, 471, 461, 599, 432; 388/800, 388/804, 811, 819, 907.5, 934
See application file for complete search history.

(56) References Cited

U.S. PATENT DOCUMENTS

| | | | | |
|---|---|---|---|---|
| 4,329,630 A | * | 5/1982 | Park .................... | 318/258 |
| 5,606,232 A | * | 2/1997 | Harlan et al. ........... | 318/138 |
| 6,016,042 A | * | 1/2000 | Miura et al. ............ | 318/430 |
| 6,040,668 A | * | 3/2000 | Huynh et al. ........... | 318/471 |
| 6,150,802 A | * | 11/2000 | Andrews ............... | 323/282 |
| 6,285,146 B1 | * | 9/2001 | Harlan ................. | 318/254 |
| 6,369,533 B1 | * | 4/2002 | Mourad et al. ......... | 318/254 |
| 6,597,135 B2 | | 7/2003 | Smith et al. | |
| 6,650,074 B1 | * | 11/2003 | Vyssotski et al. ........ | 318/254 |

OTHER PUBLICATIONS

Pat Fung, Modified PWM Fan Drive to Improve Fan Reliability, Aug. 13, 2003.

* cited by examiner

Primary Examiner—Rina Duda

(57) ABSTRACT

A motor drive circuit includes a switching circuit having an input node that receives a drive signal and a control node that receives a control signal. The switching circuit couples the input node to an output node responsive to the control signal. A bias element receives an input signal and is coupled to the output node of the switching circuit. The bias element automatically develops a bias voltage on the output responsive to the input signal. The drive circuit may be used, for example, in a motor control system to control the speed of a DC motor, such as in a power supply for a computer system.

25 Claims, 3 Drawing Sheets

SYSTEM AND METHOD FOR CONTROLLING MOTOR SPEED USING A BIASED PULSE WIDTH MODULATED DRIVE SIGNAL

BACKGROUND OF THE INVENTION

Electric motors are utilized in countless types of systems, such as control systems in manufacturing environments, consumer appliances like washers and dryers, computer peripheral devices like printers and scanners, and power supplies for computer and other types of electronic systems. A typical computer power supply includes a direct current (DC) fan and a temperature sensor coupled to a motor controller and other electronic circuitry for generating a supply voltage. The temperature sensor develops a signal indicating the temperature of the electronic circuitry and possibly the temperature of other circuitry contained in the computer system. In response to the signal from the temperature sensor, the motor controller develops control signals to control the speed of the DC motor. The DC motor operates in response to the control signals to circulate air across the circuitry and thereby remove heat generated by the circuitry.

The motor controller develops the control signals to adjust the speed of the DC motor as a function of the value of the signal from the temperature sensor. When the signal from the temperature sensor indicates the temperature is above a predetermined value, the motor controller develops the control signals to increase the speed of the DC motor. Conversely, the motor controller develops the control signals to decrease the speed of the DC motor as the indicated temperature decreases. Typically, the control signals developed by the motor controller correspond to a pulse width modulated (PWM) signal having a duty cycle that the controller adjusts to control the speed of the DC motor. As will be appreciated by those skilled in the art, such a PWM signal corresponds to a square wave having an ON value for a portion of a period of the PWM signal and an OFF value for the remainder of the period. The duty cycle of the PWM signal is defined by the ratio of the portion of the period for which the PWM signal has the ON value divided by the total period of the PWM signal.

The ON value of the PWM signal corresponds to a maximum DC voltage that is applied to energize the DC motor and the OFF value of the PWM signal corresponds to an approximately zero DC voltage. As a result, when the ON value is applied to the DC motor the motor is energized and therefore rotates and when the OFF value is applied the DC motor is deenergized or turned off. The motor controller controls the speed of the motor bike adjusting the duty cycle of the PWM signal and in this way controls the portion of each period for which the PWM signal has the ON value and the portion of each period for which the PWM signal has the OFF value. The DC motor is thus repeatedly energized or turned on and deenergized or turned off as determined by the PWM signal, with the duty cycle of the PWM signal determining the speed of the motor.

While the speed of many DC motors may be controlled using a PWM signal has just described, some DC motors are intended to be operated at a relatively constant speed or at least at the same speed for a relatively long period of time. With such DC motors, the use of the PWM signal puts stress on various components in the motor and thereby decreases the operational life of the motor, as will be understood by those skilled in the art. For example, a PWM signal may be turning a DC motor on and off 300 times a second and thus will reduce the operational life of such DC motors. These types of DC motors must therefore be controlled with a different type of signal, necessitating the design of a custom motor controller. While this may be done, PWM motor controllers are commonplace thus would be the most cost effective option many situations. For example, in some situations a third-party purchases the motor controller and the DC motor to be controlled, and because of the prevalence of PWM motor controllers it would be convenient and cost effective for the third party to utilize a PWM motor controller to control the DC motor. Currently, the use of a PWM motor controller with at least with some DC motors may decrease the operational life of the DC motor below an acceptable minimum lifetime.

There is a need for controlling the speed of all types of DC motors with a PWM signal without adversely affecting the operational life of the motor.

SUMMARY OF THE INVENTION

According to one aspect of the present invention, the motor drive circuit includes a switching circuit having an input node that receives a drive signal and a control node that receives a control signal. The switching circuit couples the input node to an output node responsive to the control signal. A bias element receives an input signal and is coupled to the output node of the switching circuit. The bias element automatically develops a bias voltage on the output responsive to the input signal. The drive circuit may be used, for example, in a motor control system to control the speed of a DC motor, such as in a power supply for a computer system.

DETAILED DESCRIPTION OF PREFERRED EMBODIMENTS

Figure 1:
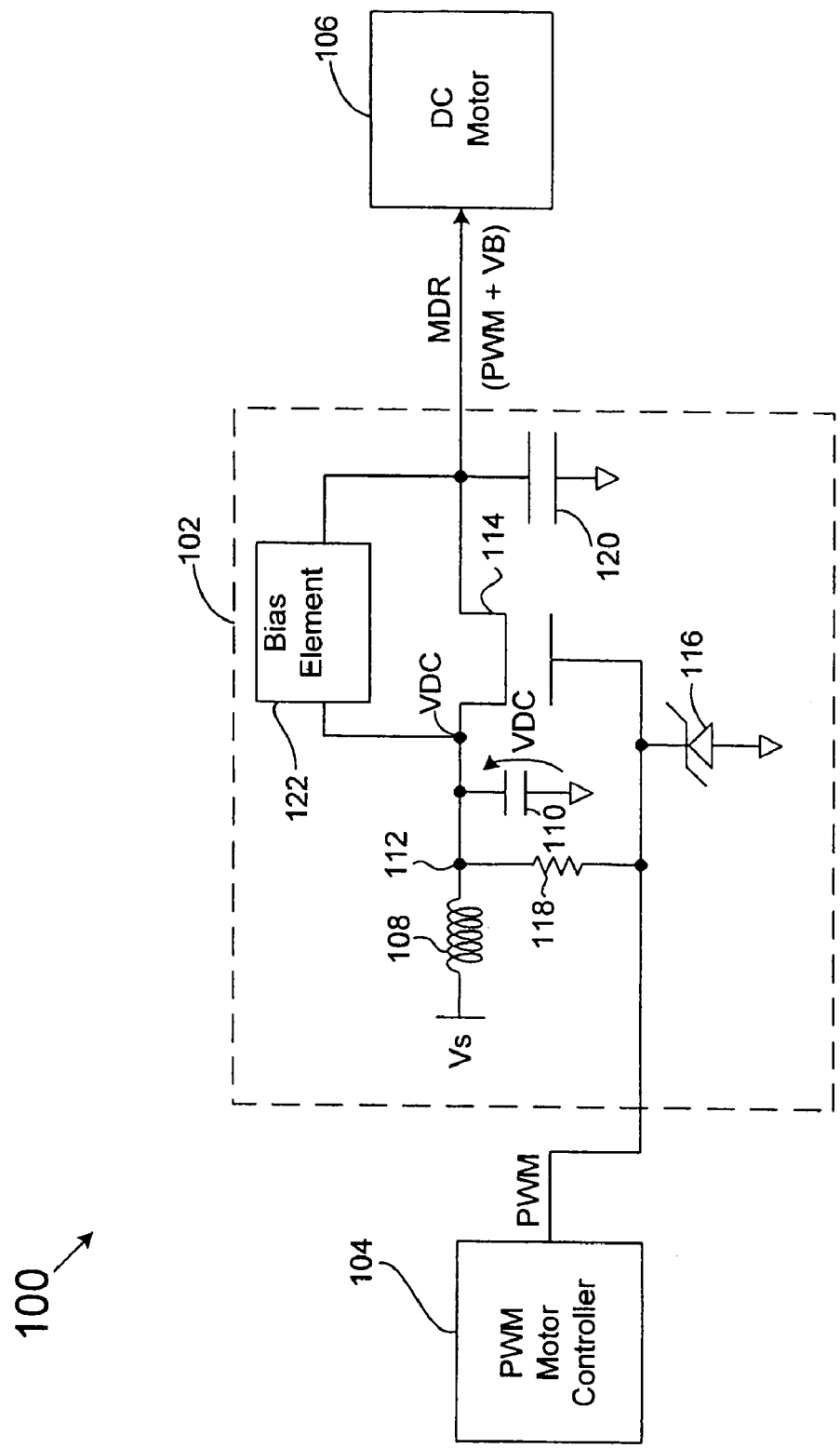
FIG. 1 is a functional block diagram of a motor control system including a motor driver that generates a motor drive signal corresponding to biased a pulse width modulated signal according to one embodiment of the present invention.

FIG. 1 is a functional block diagram illustrating a motor control system 100 including a motor driver 102 that DC biases a pulse width modulated signal PWM from a motor controller 104 to thereby prevent the operational life of a DC motor 106 from being adversely affected according to one embodiment of the present invention. More specifically, the motor driver 102 operates to apply a DC bias to the PWM signal and thereby generate a motor drive signal MDR that does not repeatedly turn the DC motor 106 on and off to prevent adversely stressing components in the motor, as will be described in more detail below. Regardless of the specific type of DC motor 106 being controlled, the motor driver 102 enables a standard motor controller 104 to be utilized simply by inserting the motor driver between the controller and the motor.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

In the motor driver 102, a supply voltage VS is supplied through an inductor 108 to charge a capacitor 110 and develop a DC voltage VDC on a node 112, which corresponds to the voltage across the capacitor. A transistor 114 receives the PWM signal on a gate and switches ON and OFF in response to the PWM signal to selectively provide the voltage VDC to the motor 106 when turned ON and to isolate the voltage VDC from the motor when turned OFF. The transistor 108 may be a power field effect transistor (FET) or other suitable type of transistor or switching circuit. The inductor 108 and capacitor 110 function to filter unwanted noise signals on the node 112 that are generated during switching of the transistor 114, as will be appreciated by those skilled in the art.

A zener diode 116 is coupled between the gate of the transistor 114 and ground to limit the maximum voltage that may be applied to the gate, preventing damage to the transistor. A resistor 118 is coupled between the node 112 and the gate of the transistor 114 to bias the gate of the transistor at approximately the voltage VDC present on the source of the transistor, which is the voltage VDC on node 110. A capacitor 120 is coupled between ground and the drain of the transistor 114 on which the motor drive signal MDR is developed, and functions to filter high frequency noise that may be present in the MDR signal. The motor driver 102 further includes a bias element 122 coupled between the source and drain of the transistor 114 that develops a bias voltage VB across the capacitor 120 in response to the voltage VDC on the node 110.

Figure 2:
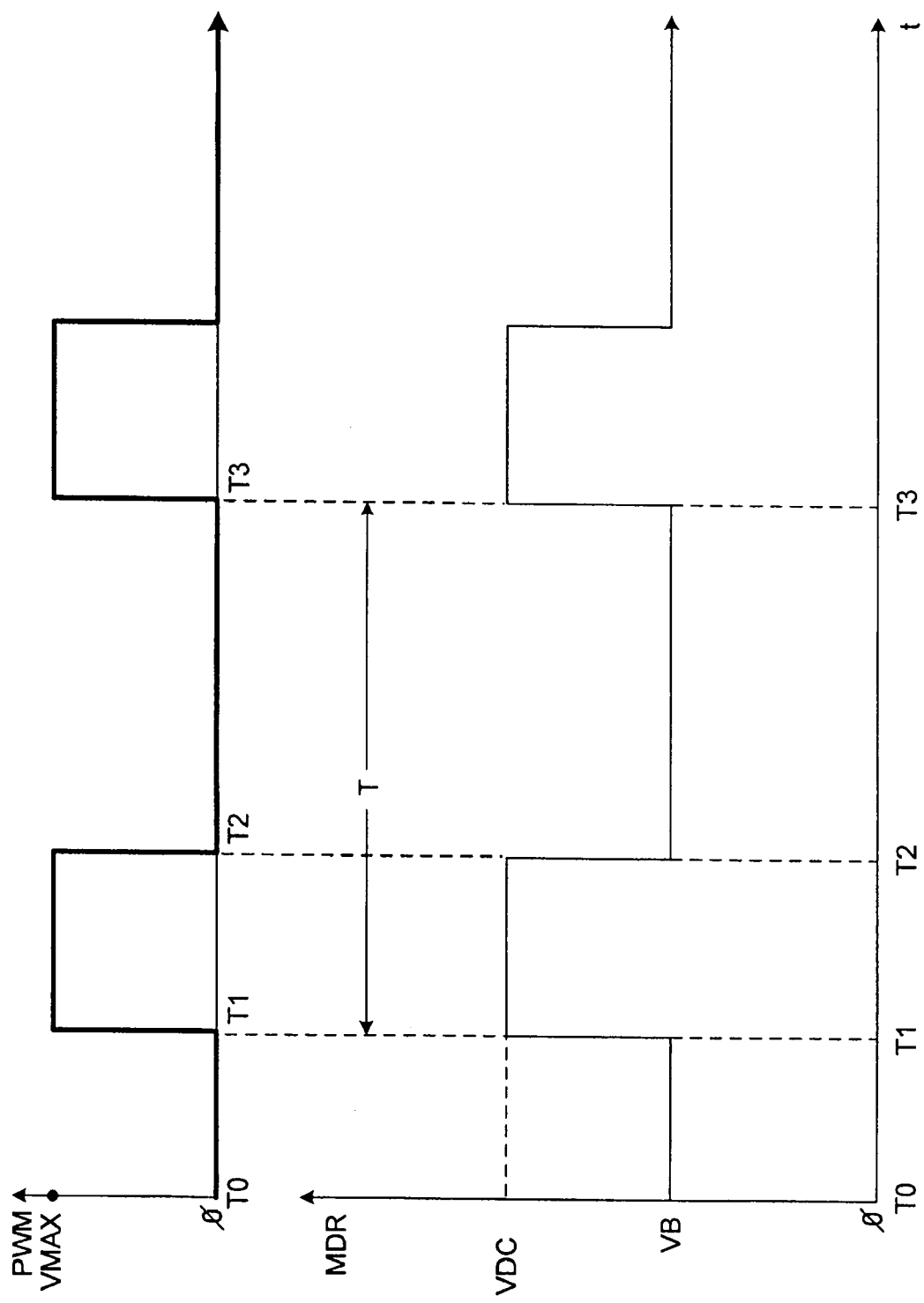
FIG. 2 is a signal timing diagram illustrating the motor drive signal generated by the motor driver of FIG. 1 in response to a PWM signal according to one embodiment of the present invention.

The overall operation of the motor control system 100 will now be described with reference to FIGS. 1 and 2, where FIG. 2 is a signal timing diagram illustrating the motor drive signal MDR developed by the motor driver 102 in response to the PWM signal developed by the motor controller 104 according to one embodiment of the present invention. In operation, assume that initially at a time T0 the motor controller 104 maintains the PWM signal at zero volts, meaning a zero duty cycle for this signal. At this point, the supply voltage VS supplies current through the inductor 108 to charge the capacitor 110 until the voltage VDC, which is approximately equal to the supply voltage, is present on the node 112. Approximately the voltage VDC is also applied to the gate of the transistor 114 at this point. This is true because very little current flows through the resistor 118 since very little current flows into the gate of the transistor 114 and through the zener diode 116 at this point. The transistor 114 thus has the voltage VDC present on its source (node 110) and on its gate and is accordingly turned OFF.

Although the transistor 114 is turned OFF, the bias element 122 supplies the bias voltage VB to the motor 106 at this point. As a result, when the PWM signal has zero duty cycle the bias voltage VB is supplied to the motor 106, which operates at some minimum speed in response to the bias voltage. This mode of operation of the motor driver 102 is illustrated in FIG. 2 at between the time T0 and a time T1, for example, which corresponds to a time when the PWM signal is zero and only the bias voltage VB is applied to the motor 106.

Now at the time T1 in FIG. 2, the motor controller 104 generates a non-zero PWM signal as shown. In response to the rising edge of the PWM signal at the time T1, the voltage of approximately VDC plus a voltage VMAX, which is the magnitude of the non-zero PWM signal, is applied to the gate of the transistor 114. The transistor 114 thus turns ON at time T1 in response to the PWM signal, providing the voltage VDC on the node 112 to the motor 106 as shown in the lower diagram of FIG. 2. As a result, the MDR signal transitions from the bias voltage VB to the voltage VDC at the time T1 as shown in the lower timing diagram of FIG. 2. In the example of FIG. 2, the PWM signal goes low at a time T2 and in response to this signal going low the transistor 114 turns OFF. Thus, at time T2 the transistor 114 isolates the voltage VDC from the motor 106 and the MDR signal is defined by the bias voltage VB from the bias element 122. The motor driver 102 continues operating in this manner to generate the MDR signal and thereby control the speed of the motor 106. The longer the transistor 114 is turned ON each period T of the MDR signal the faster the motor 106 rotates, with the fastest speed for the motor being when the transistor is turned on all the time (100% duty cycle). Conversely, a 0% duty cycle for the MDR signal causes the motor 106 to operate at its minimum speed corresponding to the bias voltage VB from the bias element 122.

The duty cycle of the MDR signal is defined by the duty cycle of the PWM signal. Thus, in the example of FIG. 2 the duty cycle of the PWM and MDR signals is given by the (T2−T1)/(T3−T1) where T3−T1 defines a period T of the PWM and MDR signals. In comparing the PWM and MDR signals, it is seen that the MDR signal is the PWM signal biased by the value of the bias voltage VB from the bias element 122. The MDR signal is thus equal to the PWM signal plus the bias voltage VB as shown. As a result of controlling the motor 106 with the MDR signal, the motor is not repeatedly turned ON and OFF many times per second and thus components in the motor are not adversely stressed. This means that use of the motor driver 102 to control the motor with the MDR signal does not reduce the operational life of the motor 106. Moreover, it should be noted that the motor driver 102 may be used to allow existing PWM motor controllers 104 to control any type of DC motor 106 simply by interconnecting the motor driver between the controller and the motor. The motor driver 102 does not need any additional or special control signals from the PWM motor controller 104 to operate, but merely the conventionally generated PWM signal. The bias element 122 automatically develops the bias voltage VB, meaning no control signal from the motor controller 104 is required to develop the bias voltage VB. Automatic or independent operation of the bias element 122 means that the PWM motor controller 104 need not be customized, allowing conventionally available controllers to be used.

In the embodiment of FIG. 1, the bias element 122 derives the bias voltage VB from the voltage VDC on the node 112, but in other embodiments the bias element generates the bias voltage other inputs. In the embodiment of FIG. 1, the bias element 122 may be resistor, a diode having an anode coupled to the node 112 and a cathode coupled to the capacitor 120, or a power amplifier having an input coupled to node 112 and an output coupled to the capacitor 120. In another embodiment, the bias element 122 is a power amplifier that receives an input voltage from another source (not shown) to generate the bias voltage VB. In still another embodiment, the bias element 122 is a digital-to-analog converter that receives from an external circuit (not shown) a digital value corresponding to the desired bias voltage VB and generates the bias voltage across the capacitor 120.

Figure 3:
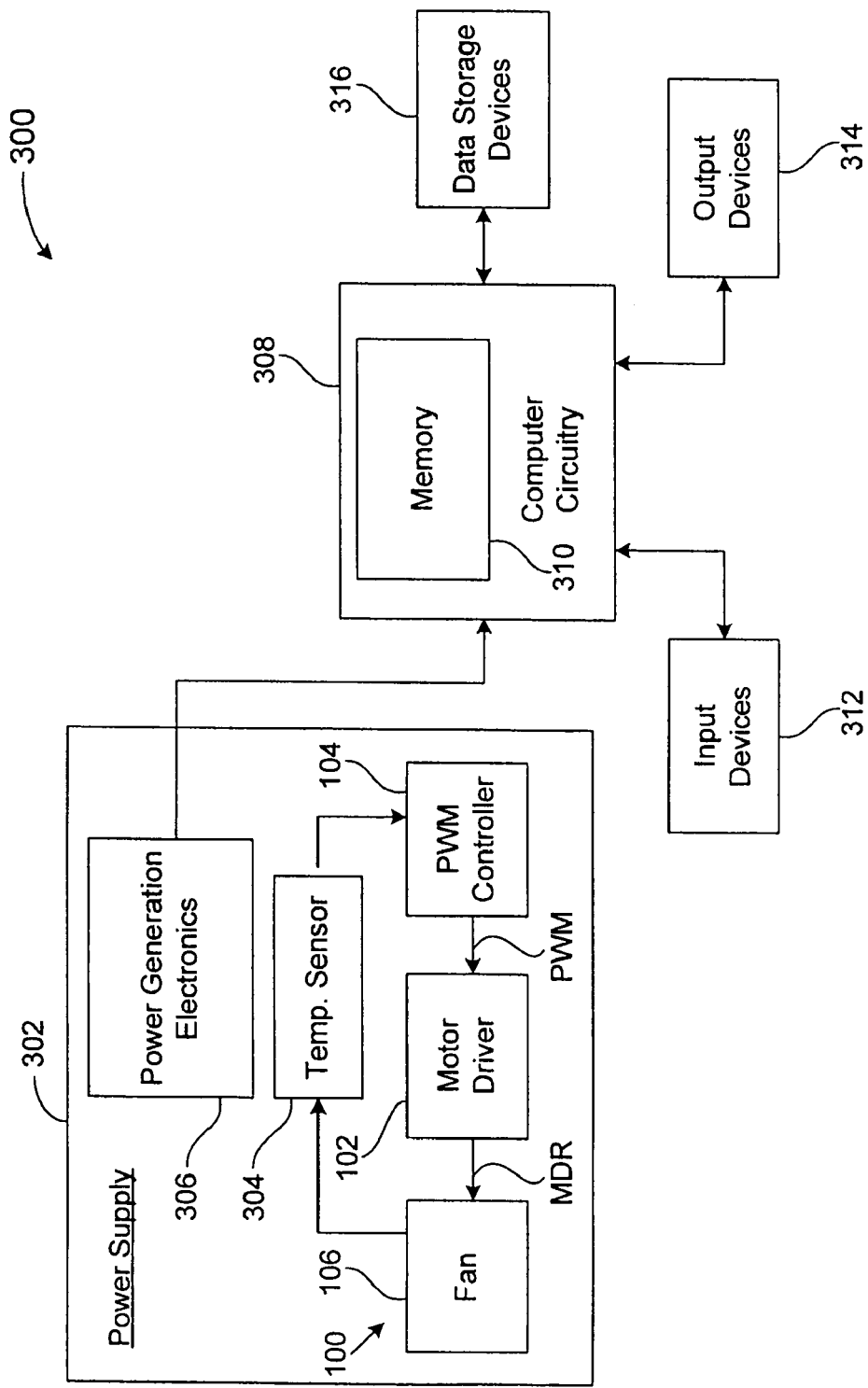
FIG. 3 is functional block diagram of a computer system including a power supply containing the motor control system of FIG. 1 according to one embodiment of the present invention.

FIG. 3 is a block diagram of a computer system 300 including a power supply 302 containing the motor control system 100 of FIG. 1 according to one embodiment of the present invention. A temperature sensor 304 is shown coupled to the PWM motor controller 104 and to a fan 106, which corresponds to the DC motor of FIG. 1. The temperature sensor 304 senses the temperature of power generation electronics 306 in the power supply 302, and in response to the sensed temperature the motor controller 104 develops a PWM signal that is applied to the motor driver 102 which, in turn, generates the MDR signal that is applied to control the speed of the fan as a function of the sensed temperature. The power generation electronics 306 generate a supply voltage that is used to power various components in the computer system 300.

The computer system 300 includes computer circuitry 308 including memory 310 for storing data and programming instructions. Typically, the computer circuitry 308 is coupled through address, data, and control buses to the memory 310 to provide for writing data to and reading data from the memory. The computer circuitry 308 includes circuitry for performing various computing functions, such as executing specific software to perform specific calculations and tasks such as word processing, data input and analysis such as through a spreadsheet, database functionality, gaming functionality, and so on. In addition, the computer system 300 includes one or more input devices 312, such as a keyboard or a mouse, coupled to the computer circuitry 308 to allow an operator to interface with the computer system. Typically, the computer system 300 also includes one or more output devices 314 coupled to the computer circuitry 308, such output devices typically including a printer and a video terminal. One or more data storage devices 316 are also typically coupled to the computer circuitry 308 to store data or retrieve data from external storage media (not shown). Examples of typical storage devices 316 include hard and floppy disks, tape cassettes, compact disk read-only (CD-ROMs) and compact disk read-write (CD-RW) memories, and digital video disks (DVDs). The temperature sensor 304 could also sense the temperature of an environment containing components of the computer system 300 in addition to those of the power supply 302, such as the computer circuitry.

One skilled in the art will understood that even though various embodiments and advantages of the present invention have been set forth in the foregoing description, the above disclosure is illustrative only, and changes may be made in detail, and yet remain within the broad principles of the invention. For example, one skilled in the art will appreciate various circuitry for forming the motor controller 104 and motor 106, and additional equivalent circuitry for forming the bias element 122. It should also be noted that some of the components described above may be implemented using either digital or analog circuitry, or a combination of both. One skilled in the art will also understand that the functions performed by components 302–316 in the computer system 300 can be combined to be performed by fewer elements or divided out and performed by more elements. Therefore, the present invention is to be limited only by the appended claims.

What is claimed is:

1. A motor drive circuit, comprising:
   a switching circuit including an input node adapted to receive a drive signal and a control node adapted to receive a control signal, the switching circuit operable to couple the input node to an output node responsive to the control signal;
   a bias element adapted to receive an input signal and coupled to the output node of the switching circuit, the bias element operable to automatically develop a bias voltage on the output node responsive to the input signal.

2. The motor drive circuit of claim 1 wherein the bias element comprises a resistor.

3. The motor drive circuit of claim 1 wherein the input signal comprises a digital input signal and wherein the bias element comprises a digital-to-analog converter operable to develop the bias voltage having a value that is a function a binary value of the digital input signal.

4. The motor drive circuit of claim 1 wherein the bias element comprises a diode having an anode coupled to receive the input signal and a cathode coupled to the output node of the switching circuit.

5. The motor drive circuit of claim 1 wherein the bias element comprises an amplifier having an input coupled to receive the input signal and being operable to develop the bias voltage on the output node responsive to the input signal.

6. The motor drive circuit of claim 1 wherein the drive signal comprises a DC voltage and wherein the control signal comprises a pulse width modulated signal.

7. The motor drive circuit of claim 1 wherein the switching circuit comprises a transistor.

8. The motor drive circuit of claim 1 further comprising:
   a filtering capacitor coupled between a reference voltage source and the input node of the switching circuit;
   a resistor coupled between the input node and the control node;
   a zener diode coupled between the control node and the reference voltage source;
   an inductor having a first terminal coupled to receive the drive signal and a second terminal coupled to the input node; and
   a capacitor coupled between a reference voltage source and the output node of the switching circuit.

9. A motor drive circuit, comprising:
   at least one an inductor having a first terminal adapted to receive a drive signal and having a second terminal;
   a switching circuit having an input node coupled to the second terminal, an output node, and a control node;
   at least one filtering capacitor coupled between a reference voltage source and the input node of the switching circuit;
   a bias element coupled between the input and control nodes of the switching circuit;
   a zener diode coupled between the control node of the switching circuit and the reference voltage source; and
   at least one capacitor coupled between a reference voltage source and the output node of the switching circuit.

10. The motor drive circuit of claim 9 wherein the switching circuit comprises a PMOS transistor.

11. The motor drive circuit of claim 9 wherein the bias element comprises a resistor.

12. A motor drive circuit, comprising:
   means for providing a motor drive signal on an output node responsive to a control signal; and
   means for automatically developing a bias voltage on the output node responsive to an input signal and independent of the control signal.

13. The motor drive circuit of claim 12 wherein the motor drive signal corresponds to a DC voltage and wherein the control signal comprises a pulse width modulated signal.

14. The motor drive circuit of claim 13 further comprising means for generating the control signal.

15. The motor drive circuit of claim 14 further comprising a means for converting electrical energy into mechanical energy responsive to the motor drive signal.

16. A motor control system, comprising:
   a motor drive circuit, including,
      a switching circuit including an input node adapted to receive a drive signal and a control node adapted to receive a control signal, the switching circuit operable to couple the input node to an output node responsive to the control signal;
      a bias element adapted to receive an input signal and coupled to the output node of the switching circuit, the bias element operable to automatically develop a bias voltage on the output node responsive to the input signal; and
   a motor controller coupled to input node of the switching circuit, the motor controller operable to apply the control signal to develop a motor control signal on the output node of the switching circuit.

17. The motor control system of claim 16 further including a DC motor coupled to the output node and the motor control signal having a characteristic adjusted by the motor controller to control a speed of the motor.

18. The motor control system of claim 16 wherein the motor controller pulse width modulates the control signal to thereby apply a pulse width modulated motor control signal on the output node of the switching circuit.

19. The motor control system of claim 16 wherein the bias element comprises a resistor.

20. The motor control system of claim 16 wherein the switching circuit comprises a transistor.

21. The motor control system of claim 16 further comprising a DC motor coupled to the output node.

22. A computer system, comprising:
   computer circuitry including memory that is operable to execute programming instructions to perform various computing functions;
   at least one input device coupled to the computer circuitry;
   at least one output device coupled to the computer circuitry; and
   a power supply system coupled to at least one of the computer circuitry and input and output devices, the power supply system operable to provide electrical power to the computer circuitry and devices and including,
      a motor drive circuit, including,
         a switching circuit including an input node adapted to receive a drive signal and a control node adapted to receive a control signal, the switching circuit operable to couple the input node to an output node responsive to the control signal;
         a bias element adapted to receive an input signal and coupled to the output node of the switching circuit, the bias element operable to automatically develop a bias voltage on the output node responsive to the input signal; and
      a motor controller coupled to input node of the switching circuit, the motor controller operable to apply the control signal to develop a motor control signal on the output node of the switching circuit; and
      a DC motor coupled to the output node and the motor control signal having a characteristic adjusted by the motor controller to control a speed of the motor.

23. The computer system of claim 22 wherein the bias element comprises a resistor.

24. The computer system of claim 22 wherein the switching circuit comprises a transistor.

25. The computer system of claim 22 wherein the power supply further includes a temperature sensor and wherein the controller controls the speed of the motor responsive to a signal from the temperature sensor.

* * * * *